United States Patent [19]

Grand Chavin

[11] 4,375,049
[45] Feb. 22, 1983

[54] STEPPING MOTOR DRIVE CIRCUIT FOR BI-DIRECTIONAL ROTATION

[75] Inventor: Paul Grand Chavin, Besancon, France

[73] Assignee: Timex Corporation, Waterbury, Conn.

[21] Appl. No.: 190,157

[22] Filed: Sep. 24, 1980

[51] Int. Cl.³ .............................................. H02K 29/00
[52] U.S. Cl. ..................................... 318/696; 368/157
[58] Field of Search ........................ 310/46, 164, 268; 318/696; 368/188

[56] References Cited

U.S. PATENT DOCUMENTS 4,055,785 10/1977 Nakajima et al. .................... 318/138
4,205,262 5/1980 Shida et al. .......................... 318/696

Primary Examiner—J. V. Truhe
Assistant Examiner—Saul M. Bergmann
Attorney, Agent, or Firm—William C. Crutcher; Joseph A. Biela

[57] ABSTRACT

An improved electrical drive circuit for a reversible electric stepping motor of the type having a coil supplied with electrical pulses to cause step-by-step rotation of a magnetized rotor, where the rotor includes additional magnetic poles for locking the rotor between steps in a stable equilibrium located so as to reduce the energy of pulses required to produce normal forward rotation of the rotor. Forward rotation is produced by a switching circuit which periodically connects a voltage source and energy dissipating means in circuit with the coil for pre-determined time intervals in a forward switching cycle. The reverse rotation switching cycle includes one or more pulse portions in the forward rotation to pre-position the rotor for reversal. Preparatory to reversal, the reverse switching cycle applied to the motor coil includes a train of high frequency pulses which reduce the electromagnetic torque in the forward rotational direction and control coil current.

7 Claims, 12 Drawing Figures

REVERSE ROTATION

STEPPING MOTOR DRIVE CIRCUIT FOR BI-DIRECTIONAL ROTATION

This invention relates to electrical drive circuits for miniature stepping motors which normally rotate in a forward direction, but occasionally require reversal. Such a stepping motor finds application in a quartz analog wrist watch where, in place of the usual crown for setting the time by mechanically rotating the hands through a gear train, the hands are corrected in a forward or reverse direction by applying trains of pulses with wave shapes in switching cycles adapted to either cause the stepping motor turn in a forward or a reverse direction. An example of a reversible motor in a timepiece actuated by special wave shapes is disclosed in U.S. Pat. No. 4,112,671 issued Sept. 12, 1978 to Kato et.al. The Kato patent employs a two pole stepping motor using pulses of alternating polarities. The wave form of a one-step reversing cycle is initiated by a pulse in the reversing direction followed by a pulse of opposite polarity to accelerate the reversal.

A newer type of stepping motor, which is preferred in the present invention is a motor of the type described in U.S. Pat. No. 4,079,279 issued Mar. 14, 1978 to C. Oudet and G. Stcherbatcheff and assigned to Portescap, S.A. This stepping motor utilizes a rotor comprised of a thin disc of magnetic material and two annular rings of alternating magnetic poles, the outer or first poles providing electromagnetic torque when a field is established by a stationary coil and stator, and the inner or second providing magnetic locking of the rotor between steps. This patent is incorporated herein by reference.

Reversal of the aforesaid stepping motor can be accomplished by means of an electrical drive circuit arranged to furnish pulses of a selected polarity, magnitude and duration to the electric coil of the stepping motor. Such a circuit is disclosed in published U.K. patent application GB 2,026,793A filed in the names of C. Oudet and Y. Guerin on May 14, 1979, which is also incorporated herein by reference. In this prior art driving circuit, five MOS transistors are employed in switching circuit with a triggering device and an external load resistor in order to provide driving pulses of both polarities to the coil, having the proper magnitude and duration to drive the stepping motor both in a forward and reversing direction. Normally the MOS transistors are incorporated as part of a large integrated circuit and require considerable percentage of the area of the circuit because of the current flowing through the MOS transistors. The external resistor, which is employed to reduce the energy supplied during the reversal cycle of the motor is an added expense in the overall drive circuit, since it is an extra component external to the integrated circuit.

It would also be desirable to utilize the same integrated circuit for stepping motors with rotors having a slightly different magnetization pattern designed to run in only one direction, as well as for the aforesaid reversible stepping motor circuit.

Accordingly, one object of the present invention is to provide a simplified electrical driving circuit for a bi-directional stepping motor.

Another object of the invention is to provide the stepping motor circuit which allows reversal using high frequency electrical pulse trains.

Another object of the invention is to provide a simplified circuit for a stepping motor which permits a universal integrated circuit suitable for both single direction and bi-directional stepping motors.

DRAWING

The subject matter which is regarded as the invention is particularly pointed out distinctly claimed in the concluding portion of the specification. The invention, however, both as organization and method of practice, together with further objects and advantages thereof, may best be understood by reference to the following description taken in connection with the accompanying drawing in which:

FIG. 1 is an exploded perspective simplified view of the stepping motor employed with the present invention, FIG. 2 is a diagram of a prior art motor coil drive circuit of the type utilized in the aforementioned U.K. patent application GB 202,693A, FIGS. 3a and 3b are system schematics of the circuit showing the universal integrated circuit portion connected in two different ways to the external components, FIG. 4 is a diagram of the motor coil drive circuitry according to the improvement of the present invention which is used in place of the FIG. 2 prior art circuit, FIG. 5 and FIG. 6 are phase diagrams for a single forward switching cycle and for a single reversing switching cycle respectively, FIG. 7 is a combined rotor torque, speed, electrical angle and current diagram for a single forward switching cycle, FIG. 8 is a similar diagram for a single reverse stiwching cycle, FIG. 9 is a modification of the circuit, FIG. 10 is a phase diagram for the reverse rotation switching cycle using the modified form of the invention, and FIG. 11 is a combined rotor torque, speed, current and electric angle diagram for the modified form of the invention.

SUMMARY OF THE INVENTION

Briefly stated, the invention comprises an improved electrical drive circuit for a reversible stepping motor of the type having a coil and stator providing a magnetic circuit for a magnetized rotor, said rotor having first poles adapted to cooperate with the magnetic circuit when electrical pulses are supplied to the coil for predetermined intervals to step the rotor in forward or reverse directions, said rotor having second poles adapted to lock the rotor in stable equilibrium positions between steps when the coil is not activated and located such that less energy is required to step the rotor forward than in reverse, the improvement in the electrical drive circuit comprising a switching circuit adapted to provide reverse switching cycle comprised of a first pulse portion initiating rotation in a forward direction and a second pulse portion applied at a time so as to cause rotor reversal and rotation in the opposite direction, at least part of the switching cycle including a train of pulses of the same polarity as those normally used to turn the rotor in a forward direction and of sufficiently high frequency to substantially reduce the current which would otherwise flow through said coil.

DESCRIPTION OF THE STEPPING MOTOR

Referring now to FIG. 1 of the drawing, a stepping motor of the type preferred for use with the improved drive circuit of the present invention is shown to consist of a coil 1 mounted on magnetizable core pieces 2 and 3, designed to be attached to an upper stator 4 and lower stator 5. The stator members 4, 5 have a plurality of radial teeth 4a, 5a respectively. A magnetized rotor 7 is disposed in the magnetic circuits between the stator teeth. The rotor 7 is preferably magnetized in accordance with the teachings of the aforementioned U.S. Pat. No. 4,079,279 to Oudet et. al. A first annular ring of N pairs of alternating polarity magnetic poles 7a are adapted to cooperate with the magnetic circuit established between stator teeth 4a, 5a to step the rotor in forward or reverse directions. A second annular ring of N/2 pairs of alternating polarity poles 7b are inwardly arranged from the first ring of poles and adapted to lock the rotor in stable equilibrium positions between steps when the coil 1 is not activated. N in this case is 6 and the angular mechanical rotation for one step is 360/N or 60°. Therefore, the angle between steps is shown between lines 8 and 9 on FIG. 1. In terms of the repetition of the switching cycle, a full step is represented in the diagrams to follow by an angle $\theta$ which equals 360° (electrical angle).

The second poles 7b are angularly offset or skewed with respect to the first poles 7a as indicated by line 10, so as to lock the rotor when the coil is not energized in a stable equilibrium position. This offset is located such that, when an electrical energy pulse is applied to the coil 1, less energy is required to be supplied to the coil to step the rotor 7 in a forward direction than in the reverse direction. Application of a pulse of pre-determined duration in the forward direction as indicated in FIG. 1 will cause the rotor to commence rotation as indicated by the arrow, whereupon the pulse is interrupted and special energy dissipation diodes serve to dissipate the excess of self-induction energy in the motor coil, damping the rotor magnet.

DISCUSSION OF PRIOR ART

Reversal of the foregoing stepping motor has been accomplished in the prior art by circuits shown in FIG. 2. In this arrangement, which is explained in detail in the published U.K. patent application GB 2,026,793A, the motor coil 1 is connected in circuit with a first pair of complementary MOS transistors 11 and 12 between the battery power supply $V_{DD}$ and $V_{SS}$, a second pair of complementary MOS transistors 13, 14. A fifth N type MOS transistor 15 and a series connected resistor 16 are connected in parallel across MOS 11. Each of the MOS transistors 11, 12, 13, 14 has an energy dissipating diode 17, 18, 19, 20 connected across its terminals. Coil 1 is connected between the junctions A and B.

In the prior art circuit, five MOS transistors are employed. Forward rotation is initiated by closing switches 11, 14 so that the positive voltage $V_{SS}$ is applied to point A. Subsequent opening and closing of the MOS devices dissipate energy and re-establish the rotor in a stable position.

Reverse rotation in the prior art circuit of FIG. 2 is accomplished by a weak pre-impulse in the forward direction followed by a strong pulse of reverse polarity furnished to the coil. The pre-impulse is established by closing switches 14, 15 to connect positive voltage to point A on the coil, but with a pulse of reduced energy due to less current on account of resistor 16. The pre-impulse moves the rotor to a position in the phase diagram where a reverse polarity pulse produces greater reverse torque. Subsequently, switches 12, 13 are closed to connect the positive voltage to point B on coil 1 initiating a strong reversal of the rotor direction. While the prior art circuit is successful for a bi-directional stepping motor, the MOS devices carry a fairly large current. If, as is the usual case, these devices are included on the large scale integrated circuit along with the triggering switches and oscillator and countdown components, they lead to MOS surface increase and current drain cell problems.

DESCRIPTION OF THE PREFERRED EMBODIMENT

Figure 3A:
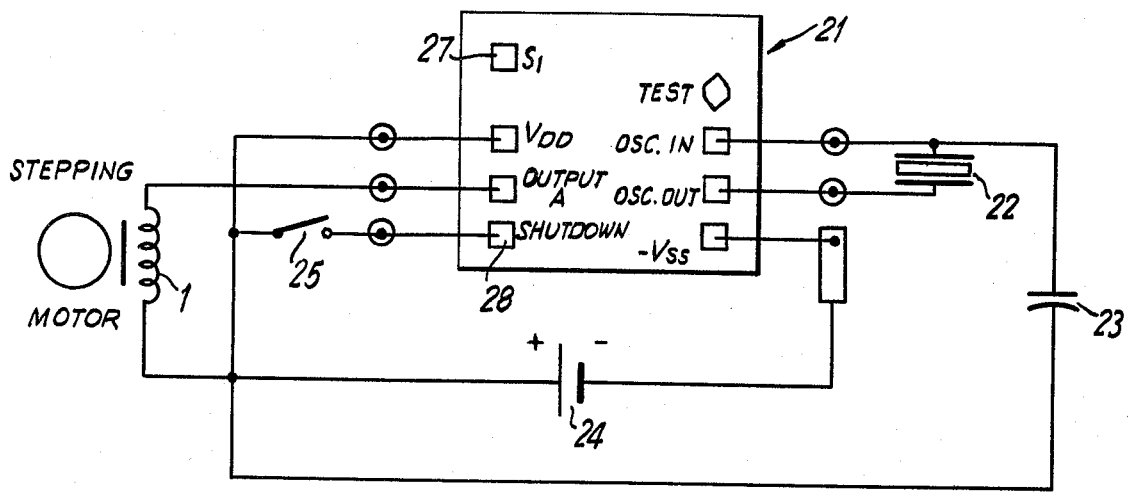
Figure 3B:
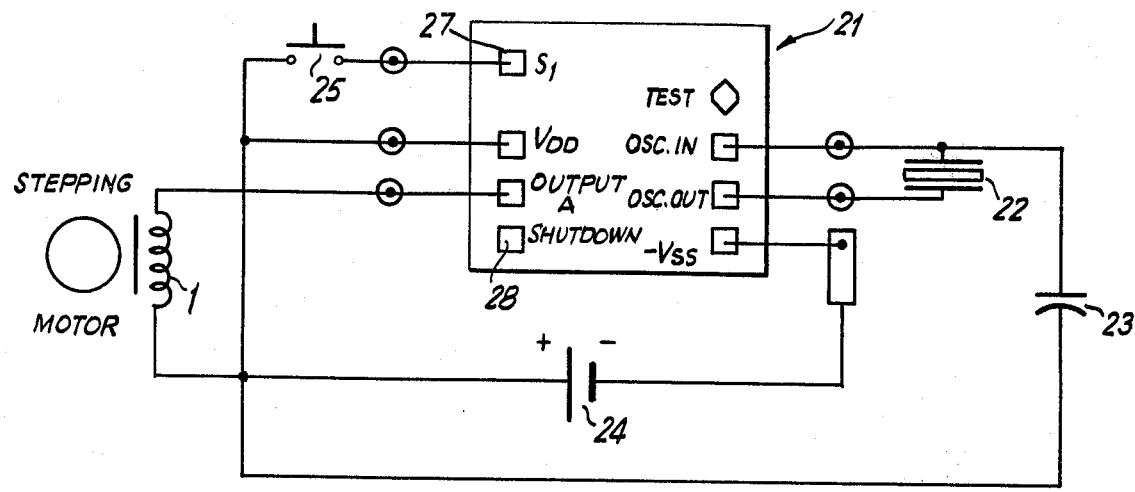

Referring now to FIG. 3a and 3b of the drawing, the improved electrical drive circuit for a reversible stepping motor is preferably implemented in an integrated circuit 21 with suitable terminals for connecting to external components associated with the stepping motor. These include the coil 1 of the stepping motor, a quartz crystal 22, a capacitor 23, a power source comprising an energy cell 24, a switch 25 and optional terminals 27, 28. The external connections to terminals 27, 28 select different internal circuits in the integrated circuit 21. Integrated circuit 21 includes conventional timekeeping components to provide a high-frequency oscillator controlled by quartz crystal 22, a chain of bi-stable flip-flops connected as countdown dividers for establishing 1/20 Hz pulses at the output. These impulses initiate normal forward stepping cycles of the motor for timekeeping purposes. The dividers also provide intermediate frequency pulses of 1 Hz and 16 Hz to initiate forward and reverse switching cycles for rotating the stepping motor in forward or reverse directions at higher rates of speed. The foregoing integrated circuit functions are conventional and are not material to the present invention, except to set the frequency of initiation of the switching cycles (or steps) made by the stepping motor. The present invention is concerned with the drive circuit components and switching means required to effect a single forward step or a single reverse step, it being understood that multiple forward steps or multiple reverse steps are simply accomplished by repetitively initiating the switching cycle, at any desired repetition rate, so long as the repetition time for a new step is not less than is required to complete a full step.

It is also understood that the countdown divider on the integrated circuit chip 21 may provide a source of pulses of any desired frequency integrally divisible into the frequency of the quartz crystal 22, selected here at 32, 768 Hz, one such frequency being 1024 Hz. Also it will be understood by those skilled in the art, that precise control signal pulses can be generated of a predetermined duration at a predetermined time by means of logic circuitry on the integrated circuit, through combining one or more output frequencies along the divider chain. The generation of several such trigger pulses of a few milliseconds duration in succession for the purposes of turning off and on the MOS switch devices also incorporated on the integrated circuit is a matter of selection of proper design parameters and is well-known to those skilled in the art.

Figure 2:
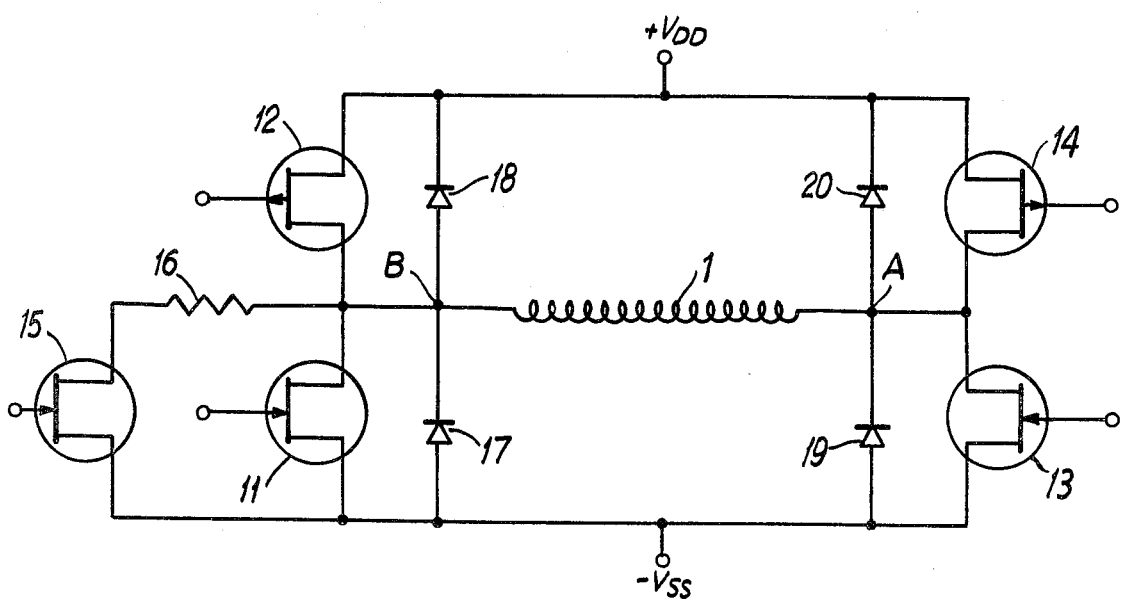
Figure 4:
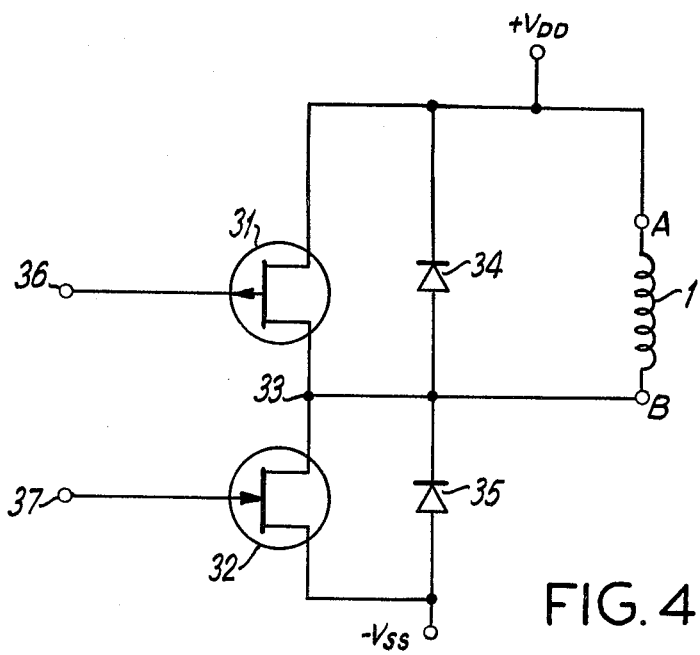

Referring to FIG. 4, in accordance with the present invention, the switching circuit for the stepping motor is seen to comprise a pair of complementary MOS transistors connected between the positive voltage source $V_{DD}$ and negative terminal $V_{SS}$. These comprise a P type MOS transistor 31, and a N type transistor 32 with a source-to-drain connection 33. A first diode 34 is connected between junction 33 and $V_{DD}$ and a second diode 35 is connected between $V_{SS}$ and junction 33. The motor coil 1 is also connected between junction 33 and $V_{DD}$. The FIG. 4 driving circuit provides the same reversing functions as the aforementioned prior art circuit in FIG. 2, when supplied with the proper wave shapes, switch closures, and pulse trains in accordance with the improvement of the present invention.

Figure 5:
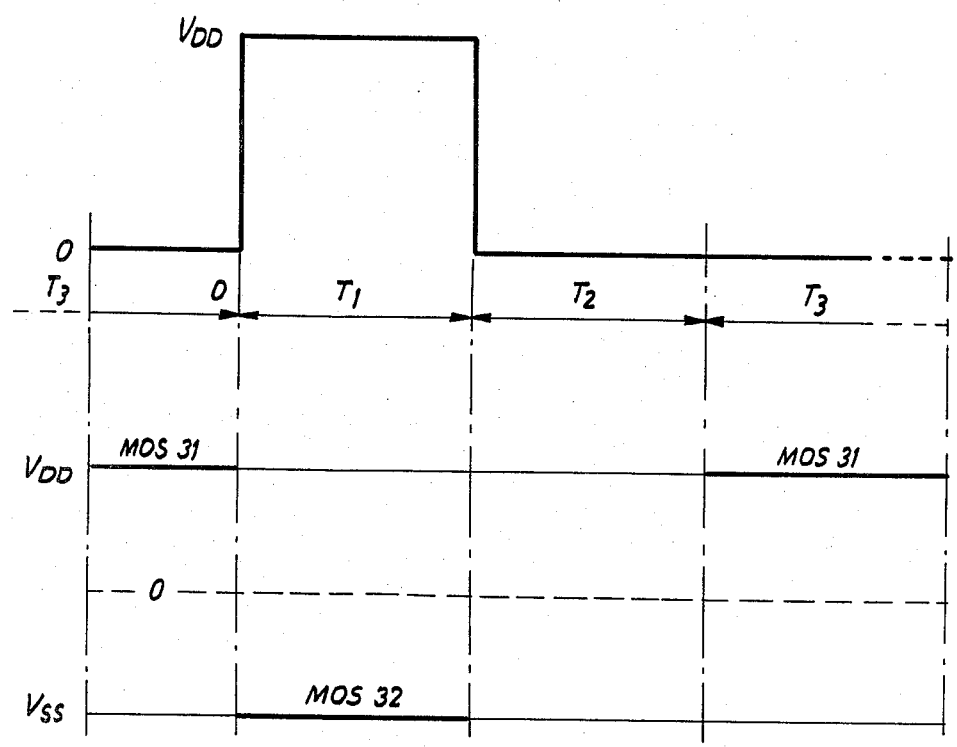

FIG. 5 is a phase diagram illustrating the opening and closing of switches 31, 32 during one complete forward switching cycle providing forward rotation of the stepping motor. During the period $T_1$, preselected at 3.9 milliseconds, MOS 32 is supplied with a control signal at terminal 37 which causes MOS 32 to conduct and closes a circuit connecting point B of coil 1 to voltage $V_{SS}$, causing current to flow from $V_{DD}$ to $V_{SS}$ through coil 1.

During $T_2$ also selected as 3.9 milliseconds duration, no control signals are applied and both switches 31, 32 are open. The excess of self-induction energy in the motor coil is dissipated in diode 34, damping the rotor magnet.

$T_2$ is the remaining time in the cycle until the next motor pulse. During $T_3$, switch 31 is closed by a control signal on terminal 36, shorting motor coil 1. Therefore the rotor is maintained in a stable position by the locking magnets. The period $T_3$ is not of fixed length, but depends upon the desired repetition rate of initiating the stepping motor cycles. In a timepiece, this repetition rate might be 1/20 Hz for normal rotation, or 1 Hz or 16 Hz for correction or time setting of stepping motor.

Figure 6:
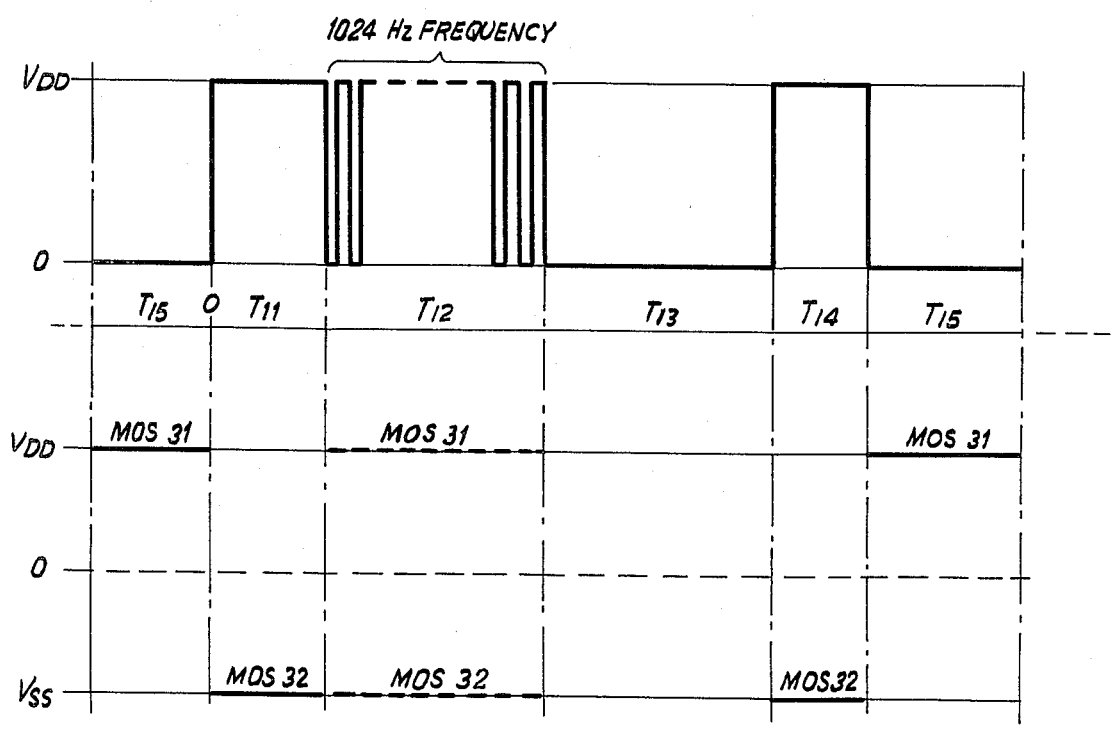

FIG. 6 illustrates operation of the improved circuit during the reverse rotation of the stepping motor. $T_{11}$ is a first pulse portion preselected as 3.9 milliseconds supplied to the rotor in the same manner as forward rotation. This is accomplished by applying a control signal to MOS transistor 32, causing it to conduct.

In accordance with the present invention, the second pulse portion of the reversing switching cycle occurs during period $T_{12}$ by applying a train of high frequency pulses to the motor coil. As seen in FIG. 6, a high frequency control signal of 1024 Hz is applied alternatively to terminals 36 and 37 at the gates of MOS 31 and MOS 32 which results in rapid opening and closing of MOS transistor switches 31 and 32, and application of high frequency voltage pulses to motor coil 1. $T_{12}$ is preselected here at 5.86 milliseconds. $T_{13}$ is a period of 7.8 Milliseconds. $T_{14}$ is a period of 2.9 milliseconds. As will be explained, this train of high frequency pulses effectively limits the current through the motor coil and damps the rotor magnet causing it to reverse and be pulled backwards. $T_{12}$ is preselected here as 5.86 milliseconds.

$T_{13}$ is a period of 7.8 milliseconds comprising the time when both of the transistor switches 31, 32 are open. The self-induction energy in the motor coil is dissipated in a circuit established through diode 34, damping the movement of the rotor magnet in its counter clockwise motion.

$T_{14}$ is a period of 2.9 milliseconds where switch 32 is closed by a control signal to apply a positive polarity again to motor coil 1. In the particular angular phase position at which the rotor is disposed at this time, this pulse provides additional electromagnetic energy in counter clockwise or reverse rotation direction.

Lastly, $T_{15}$ is a period when transistor switch 31 is closed and the coil is shorted, causing rotor magnet damping and braking. The rotor is then held by the locking magnets 7b in a locked condition. Time period $T_{15}$ is variable, lasting until the next counter clockwise reverse switching cycle is applied. It should be particularly noted that reversal is accomplished with pulses of the same electrical polarity as forward rotations, contrary to the prior art.

Figure 7:
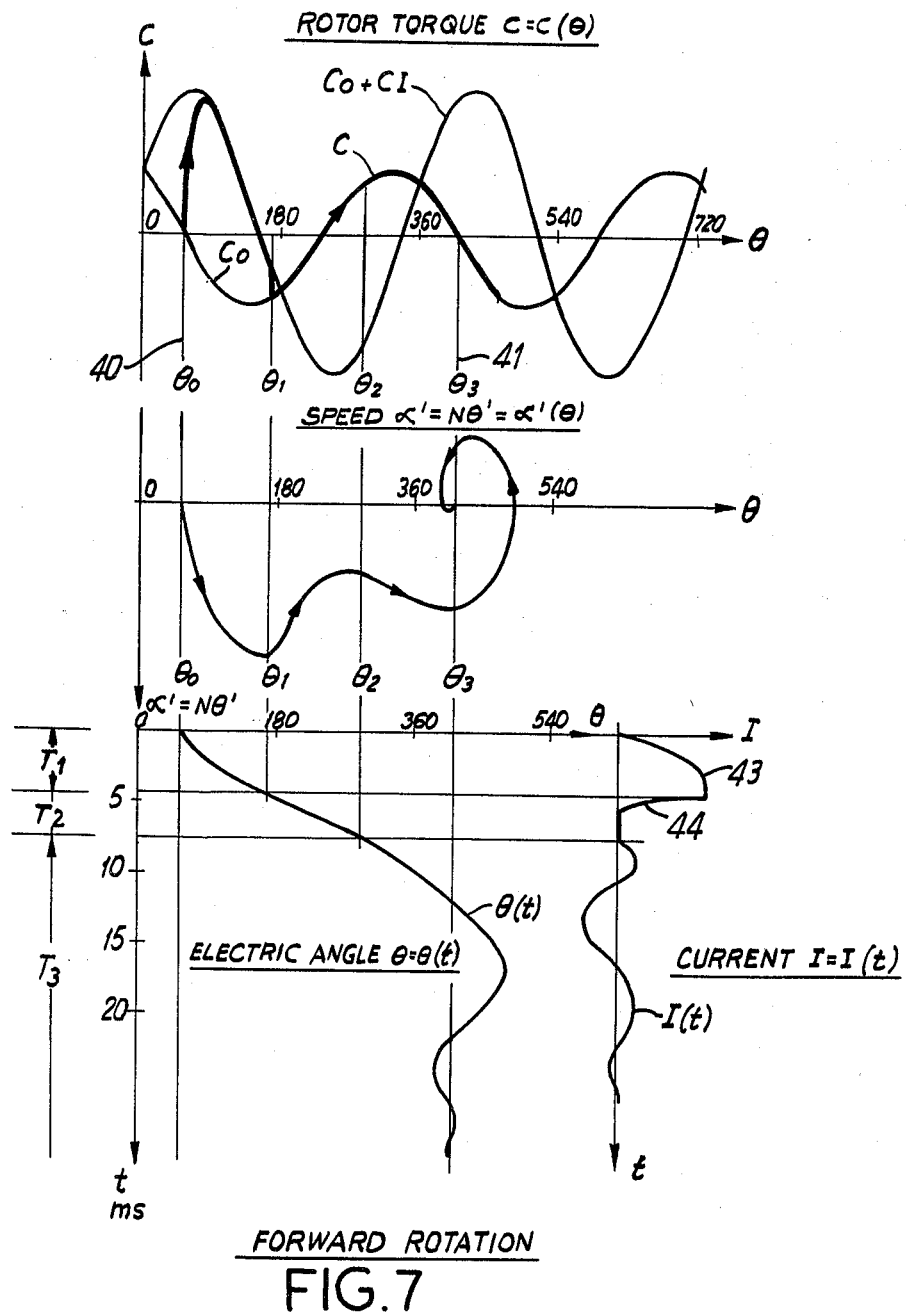
Figure 8:
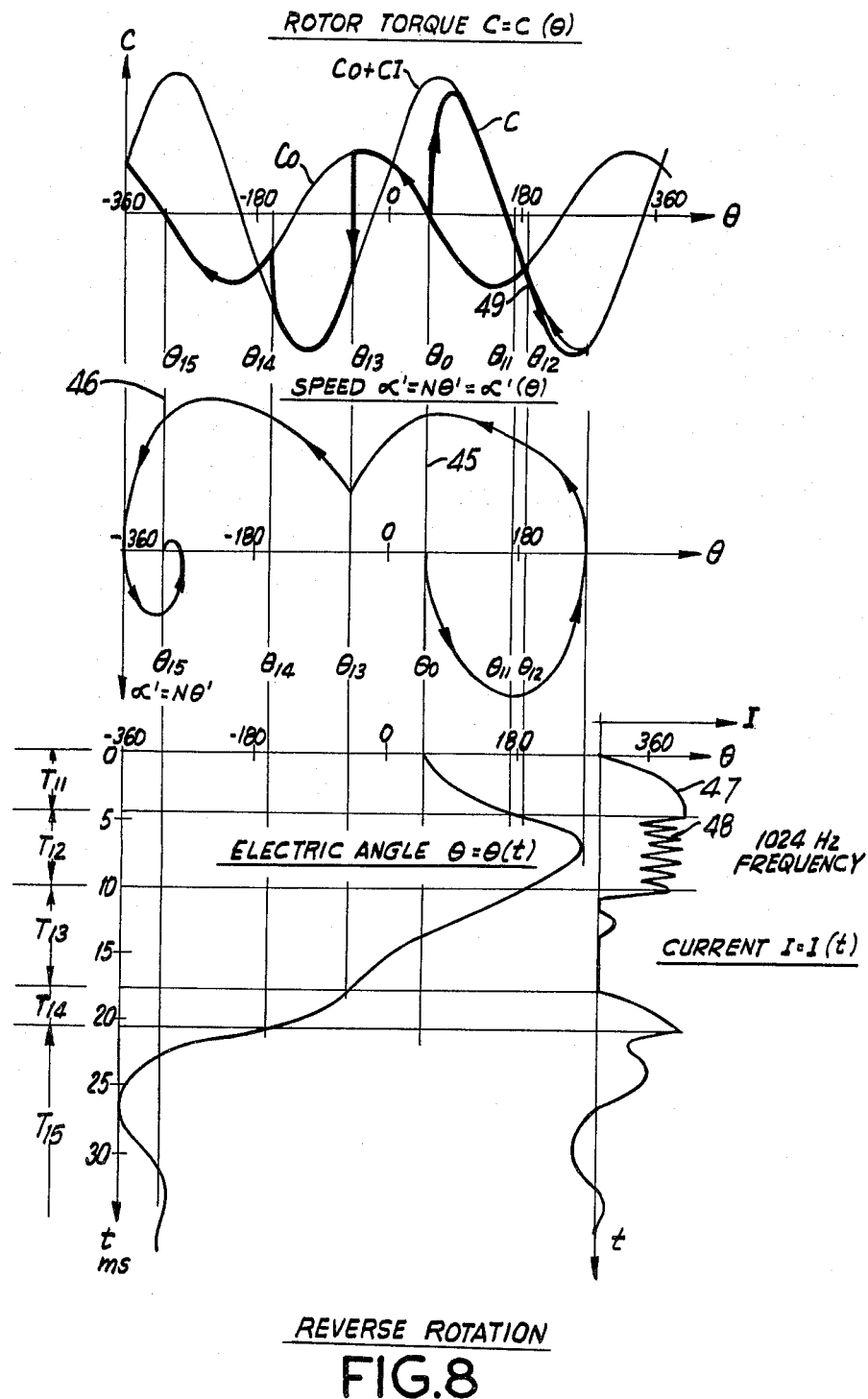

Referring now to FIGS. 7 and 8, the operation of the invention will be described for a forward rotation step shown in FIG. 7 and a reverse rotation step according to the present invention in FIG. 8.

Figure 1:
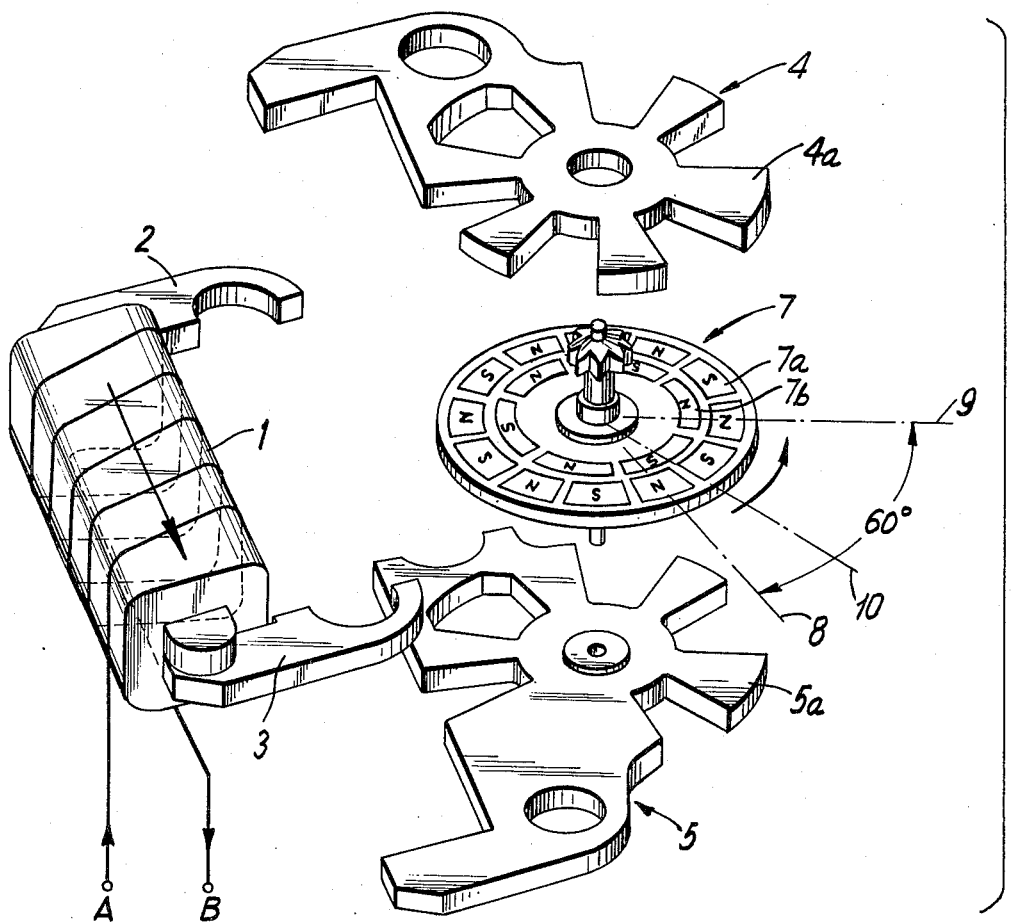

The sine curve $C_o$ is the magnetic torque applied to the rotor by the locking magnets 7b (see FIG. 1) and represents the torque exerted in the forward direction (above the line) and in the reverse direction (below the line) at any electrical angle $\theta$. A complete stepping cycle where $\theta$ equals 360° is equivalent to a mechanical angle of 60° between lines 8, 9 in FIG. 1. The stable equilibrium positions where no current is flowing in coil 1 represented by line 10 in FIG. 1 is therefore represented at angles $\theta$ shown by lines 40 and 41 in FIG. 7.

The second sine curve $(C_o + C_I)$ is the combined rotor torque with current I through the motor coil and consists of a composite of the locking torque due to the curve $C_o$ and the electromagnetic torque $C_I$ generated when the coil is energized.

The heavy curve C is the actual or applied torque, taking into effect the energization and de-energization of coil 1 by the switching circuit. Therefore during time period $T_1$, when voltage is applied to coil 1, the torque rises from 0 to the value on the $C_o + C_I$ curve and follows it until the coil is de-energized at the end of period $T_1$. Thereafter, the torque follows the $C_o$ curve. The speed of the rotor is indicated on the speed portion of the diagram indicating movement from the first stable position 40 to the second stable position 41.

The angular position of the rotor $\theta(t)$ is indicated on the electric angle portion of the graph at any time t through the time periods $T_1$, $T_2$, $T_3$.

The current in coil 1 is illustrated by curve I(t). During the period $T_1$ current rises exponentially in the coil, opposed by the self-inductance, and when the period $T_2$ commences, the current falls exponentially, aided by the self-inductance as shown by graph portions 43, 44 respectively. In both cases, the idealized curves are complicated by movement of the rotor which constantly changes the reluctance of the electromagnetic path and also generates counter emf due to action of the magnetic poles. The action of the circuit shown in FIG. 7 is known in the art.

In accordance with the invention, a reversing step is illustrated in FIG. 8. In this case, the rotor position moved counter clockwise during the switching cycle from a first stable equilibrium position illustrated at line 45 to a second stable equilibrium position indicated at line 46. As before, the heavy curve C illustrates the actual torque applied to the rotor both during energized and de-energized portions of the cycle, due to the locking torque of poles 7b at all times and due to the electromagnetic torque of poles 7a while the coil is energized. During the first time period $T_{11}$, the rotor movement is initiated by a pre-impulse in a clockwise direction to a position $\theta_{11}$. Subsequently, during time period $T_{12}$, the series of high frequency pulses is applied. Since the combined torque experienced by the rotor in this phase position is such that a positive polarity voltage pulse (A to B in coil 1) will produce a negative torque, the movement of the rotor is reversed by the negative torque and moved backward toward position $\theta_{12}$. During this time, the peak current due to self-inductance would ordinarily be very high if a single pulse of a few milliseconds duration were applied. However, application of high frequency pulses increases the effective impedance of the coil circuit limiting the current flow, somewhat equivalent to adding a resistor in series with the coil. The current curve shows that after a rise in coil current illustrated by curve portion 47, the current is then limited along portion 48 of the curve.

Commencing with time period $T_{13}$ current supplied to the coil is interrupted, and the travel of the rotor continues in the reverse direction under the influence of magnetic poles 7b until the rotor reaches position $O_{13}$. A pulse is again applied and, since the rotor is now in a phase position where a positive electrical pulse produces a negative electromagnetic torque, the rotor is given another push in the reverse direction. Commencing with time period $T_{15}$, the rotor coil is shorted and the rotor achieves a stable position under the action of the braking magnets.

Thus the reversal of the stepping motor is accomplished with a greatly simplified circuit employing only two MOS devices, rather than five MOS devices plus an external resistor, as in the prior art. The integrated circuits shown can be used either for a single direction stepping motor or a bi-directional stepping motor simply by connecting the circuit providing the switching cycle shown in FIG. 5, or by making connections into the portion of the circuit providing the switching cycles shown in FIGS. 5 and 6. Reduction of the number of space utilizing MOS devices on the integrated circuit reduces its size with resulting economy of the circuit.

MODIFICATION OF THE INVENTION

Figure 9:
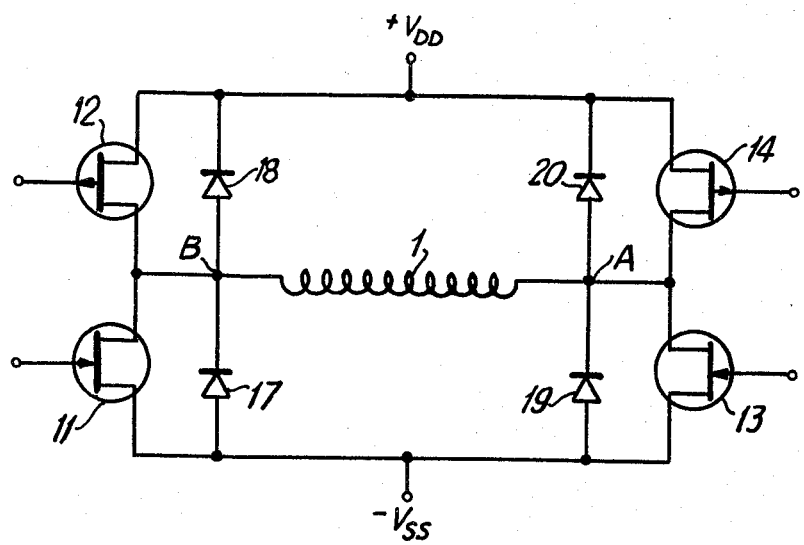
Figure 10:
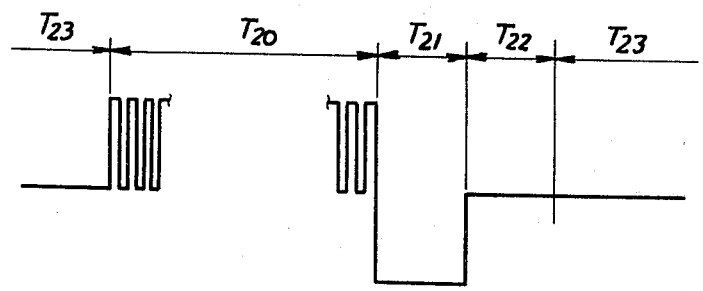
Figure 11:
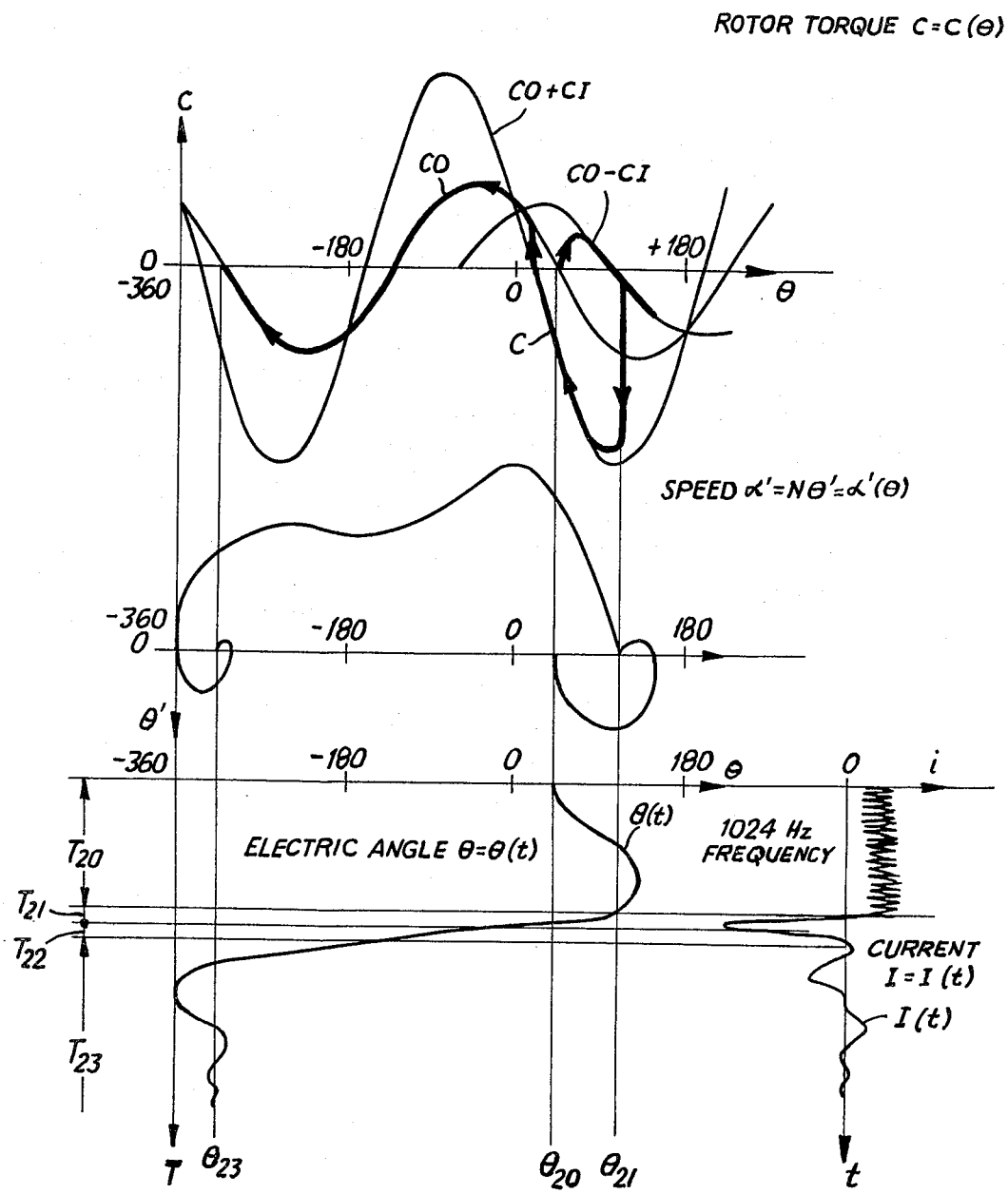

While the above advantages are achieved in the preferred embodiment, with unipolarity impulses, a modified form of the invention using alternating polarity pulses still allows the elmination of the external resistor and one of the MOS devices. This employs the utilization, as before, of a train of high frequency pulses to reduce the effective coil current and therefore to reduce the energy supplied in the forward rotation direction. This modification provides a weak pre-impulse equivalent to the method of reverse rotation utilized in the aforementioned U.K. patent application 2,026,793. The drive circuit of the modified form of the invention is shown in FIG. 9. FIG. 9 is the same as the prior art circuits shown in FIG. 2, except that the external resistor 16 and MOS transistor 15 have been eliminated. The switching cycle diagram for the modified circuit is shown in FIG. 10. The first pulse portion of the reversing cycle indicated as $T_{20}$ comprises a train of high frequency pulses supplied to the coil 1 by closing $MOS_{11}$ and by triggering alternately $MOS_{14}$ and $MOS_{13}$. The second pulse portion $T_{21}$ comprises a pulse of reverse electrical polarity obtained by closing switches 12, 13 so as to connect the B end of the motor coil to voltage $V_{DD}$ and the A end of coil 1 to voltage source $V_{SS}$.

During pulse period $T_{22}$, switch 12 is open, switch 13 is closed and the excess energy of self-induction is dissipated in diode 17. During time period $T_{23}$, MOS transistors 11, 13 are closed to short the rotor coil and it is maintained in a locked position by the magnetized rotor poles 7b.

In this manner, the modified form of the invention, although it does not employ pulses of a single polarity, utilizes the novel feature of applying a high frequency pulse train to reduce the current and thus the electromagnetic torque during pre-impulse applied in the forward rotor direction preparatory to reversal of the motor.

While there has been described what has been considered to be the preferred embodiment of the invention and one modification, it is desired to cover in the appended claims all such modifications as fall within the true spirit and scope of the invention.

It is claimed:

1. An improved electrical drive circuit for a reversible stepping motor of the type having a coil and stator providing a magnetic circuit for a magnetized rotor having first poles adapted to cooperate with said magnetic circuit when electrical pulses are supplied from a voltage source, said circuit having means providing pulses of predetermined polarity and frequency to said coil for pre-determined intervals to step the rotor in forward or reverse direction, said rotor having second poles adapted to lock the rotor in stable equilibrium positions between steps when the coil is not activated, such stable positions being located such that less energy is required to step the rotor forward than in reverse; the improvement in said drive circuit comprising:
a switching circuit adapted to provide a reverse switching cycle comprised of a first pulse portion initiating rotation in a forward direction and a second pulse portion applied at a predetermined time during rotation so as to cause a reverse electromagnetic torque to reverse rotation and move it in the opposite direction, at least one of said pulse portions comprised of a high frequency pulse train of pulses of the same polarity of those normally used to turn the rotor in the forward direction and of sufficiently high frequency to reduce the current which would otherwise flow through said coil.

2. The combination according to claim 1, wherein said reverse switching cycle is comprised of pulses all of the same voltage polarity applied to the coil.

3. The combination according to claim 2, wherein said high frequency pulse train occurs during the second pulse portion.

4. The combination according to claim 1, wherein said high frequency pulse train occurs during said first pulse portion and wherein the second pulse portion is of reversed electrical polarity to the first pulse portion.

5. The combination according to claim 1, wherein said reverse switching cycle also includes a cycle portion wherein the switching circuit couples said coil in an energy dissipating circuit in order to dissipate the self-induction in the coil during reverse rotation.

6. The combination according to claim 5, wherein said reversing cycle further includes a cycle portion, wherein said switching circuit is connected to short the coil whereby the second poles lock the rotor in a stable equilibrium position.

7. The combination according to claim 1 wherein the switching circuit is adapted to provide a forward switching cycle for stepping the rotor in a forward direction, said forward and reverse switching cycles all being comprised of pulses of the same electrical polarity supplied to the coil.

* * * * *